United States Patent [19]

Feldl

[11] Patent Number: 5,096,045
[45] Date of Patent: Mar. 17, 1992

[54] PORTABLE CONVEYOR SYSTEM

[75] Inventor: Erich J. Feldl, Poquoson, Va.

[73] Assignee: Pace Corporation, Newport News, Va.

[21] Appl. No.: 574,816

[22] Filed: Aug. 30, 1990

[51] Int. Cl.$^5$ .............................................. B65G 21/06
[52] U.S. Cl. .................... 198/583; 198/816; 198/860.2; 198/835
[58] Field of Search ............... 198/575, 583, 806, 841, 198/842, 813, 814, 816, 860.2, 834, 835

[56] References Cited

U.S. PATENT DOCUMENTS

| | | | |
|---|---|---|---|
| 895,529 | 8/1908 | Wyland . | |
| 1,540,560 | 6/1925 | Nelson | 198/583 X |
| 1,603,633 | 10/1926 | Nelson | 198/583 |
| 1,815,135 | 7/1931 | Williams . | |
| 2,563,427 | 8/1951 | Scott . | |
| 2,638,204 | 5/1953 | Collis | 198/583 |
| 2,895,593 | 7/1959 | McKnights et al. | 198/816 X |
| 2,953,241 | 9/1960 | Lehman | 198/816 |
| 3,082,858 | 3/1963 | King | 198/841 |
| 3,289,818 | 12/1966 | Kittredge | 198/816 X |
| 3,361,248 | 1/1968 | Daymon . | |
| 3,483,639 | 12/1969 | Eftefield et al. | 198/834 X |
| 3,752,298 | 8/1973 | Wenger | 198/816 |
| 4,008,801 | 2/1977 | Reilly et al. | 198/841 |
| 4,360,098 | 11/1982 | Nordstrom . | |
| 4,401,562 | 8/1983 | Spuglos . | |
| 4,488,846 | 12/1984 | Helberschmidt . | |
| 4,925,009 | 5/1990 | Hill | 198/583 |

*Primary Examiner*—D. Glenn Dayoan
*Attorney, Agent, or Firm*—Wallace J. Nelson

[57] ABSTRACT

A portable conveyor system having multiple, separable, conveyor sections, a separable latching bridge mechanism disposed between and connecting each two adjacent conveyor sections, a single drive motor for the system, a belt driving gear arrangement on each end of each conveyor section for driving the conveyor belt, a pair of idling gears carried by each separable latching bridge mechanism and adapted to engage and connect the roller gears on adjacent conveyor sections when the latching bridge mechanism is employed to latch adjacent conveyor sections. Snugger rollers are provided to adjust the tension on the conveyor belt on each conveyor section.

8 Claims, 4 Drawing Sheets

PORTABLE CONVEYOR SYSTEM

FIELD OF THE INVENTION

This invention relates to conveyor systems in general, and relates in particular to a portable endless belt type, conveyor system formed of a plurality of individual conveyor sections disposed and connected in end-to-end relationship by individual bridging latch mechanisms.

BACKGROUND OF THE INVENTION

Belt type conveyor units are well known and are employed in numerous applications requiring the movement of cargo, field crops, in factory assembly lines, and the like. Many of these known systems are expensive to build or acquire, they are cumbersome, difficult to assemble or move, and not readily adaptable for different uses.

There is a definite need in the art for a lightweight, inexpensive, portable conveyor system that is reliable in operation and requires minimum maintenance effort.

It is therefore an object of the present invention to provide a novel belt type conveyor system, formed of individual conveyor sections, that permits tailoring of the system to the desired length.

Another object of the present invention is to provide a novel bridge mechanism for connecting two conveyor sections in end-to-end relationship to form a single conveyor system.

A further object of the present invention is a bridge mechanism employing a novel latch plate for connecting adjacent conveyor sections.

An additional object of the present invention is a portable conveyor system employing a single drive unit for multiple belt conveyor sections.

Still another object of the present invention is a conveyor system formed of multiple conveyor sections with each section having adjustable snugger rollers to maintain uniform belt tension during use.

SUMMARY OF THE INVENTION

According to the present invention the foregoing and additional objects are attained by providing a plurality of elongated conveyor sections, each supported on its individual frame, and disposed in adjacent end-to-end relationship. Each conveyor section includes an endless link conveyor belt supported on a substantially planar belt support and rotatable about a pair of belt rollers disposed, one each, at each end on the frame. A roller spindle extends across, and is provided with end portions extending from each end of, each section frame. A roller gear is secured to and rotatable with each belt roller adjacent each end thereof. An adjustable height snugger roller is provided at each end of the frame sections adjacent the belt roller spindles to adjust and maintain the desired belt tension. A bridge mechanism, having a skid plate supported on a bridge spindle, is disposed between each two adjacent conveyor sections. An end bracket is disposed on each end of the bridge spindle and adapted to be received within portions of the frame sections on the two conveyor sections to be joined by the bridge mechanism. A latching device is rotatably disposed exteriorly adjacent each end bracket on the bridge spindle and serves to engage the ends of respective roller spindles on two adjacent conveyor sections for releasable connection thereof. When latched, an idler gear rotatably disposed on each end of the bridge spindle meshes with the roller gears on the two adjacent conveyor sections to transfer rotation of the roller gears in one section to the roller gears in the adjacent section. A motor drive is provided in connection with drive gears of one end section of the conveyor system and, through a pair of idler gears, serves to drive the conveyor belts on that and all connected sections.

BRIEF DESCRIPTION OF THE DRAWINGS

A more complete appreciation of the invention and many of the attendant advantages thereof will become more readily apparent as the same becomes better understood with reference to the following drawings wherein.

DETAILED DESCRIPTION

Figure 1:
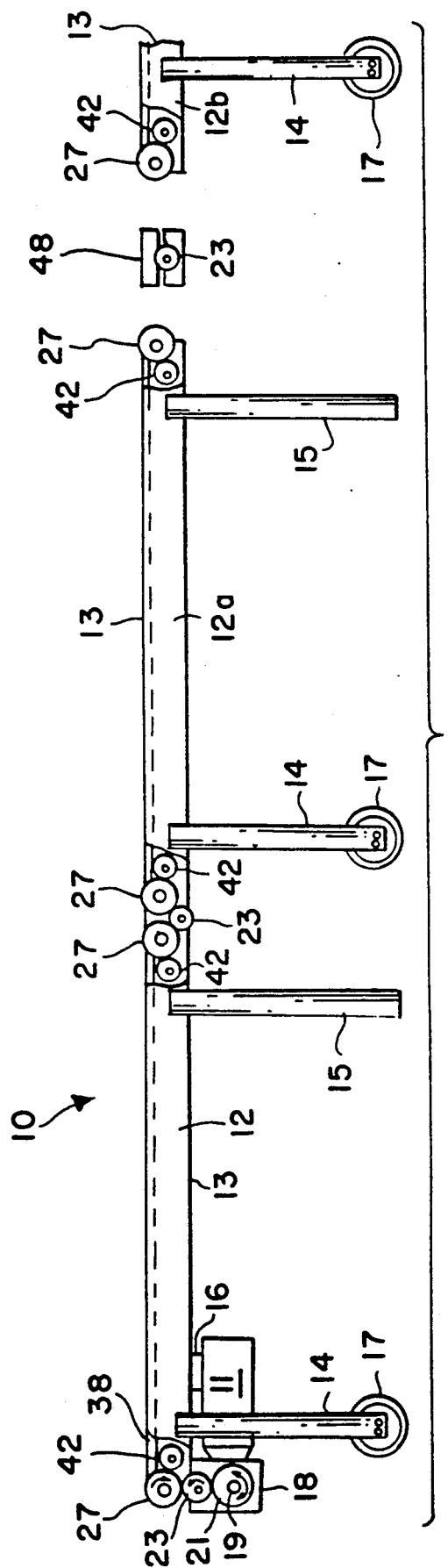
FIG. 1 is a part exploded, side elevation (with parts broken away) illustrating a multiple section, conveyor system according to the present invention.

Referring now to the drawings and more particularly to FIG. 1, the conveyor system of the present invention is shown and designated generally by reference numeral 10. Conveyor system 10 is formed of a plurality of independent conveyor sections 12, 12a, 12b, etc. Each section 12, 12a, 12b, etc. includes an elongated, substantially rectangular, frame 13 and two depending leg pairs 14, 15 bolted or otherwise conventionally attached to and spaced from the ends of frame 13. Only one member of each of leg pairs 14, 15 is illustrated, it being understood that the opposite member is of identical construction and attached to the opposite side of frame 13. A suitable cross bar (not shown) is attached to and disposed between each leg pair for support thereof in a conventional manner. In the illustrated embodiment, leg pairs 14 are each provided with a rotatable wheel 17, while leg pairs 15 are designed to contact the ground or other surface on which conveyor system 10 is to be employed. Additional wheels may be provided on leg pairs 15 if so desired where more mobility for the system is needed or desired. Also, wheels 17 may be omitted from both leg pairs in some instances. Each member of leg pairs 14, 15 is formed of a U-channel bar of lightweight metal, such for example, aluminum or aluminum alloy. A drive motor 11 is supported by a suitable bracket 16 that spans and is bolted or otherwise conventionally secured to frame 13.

Figure 2:
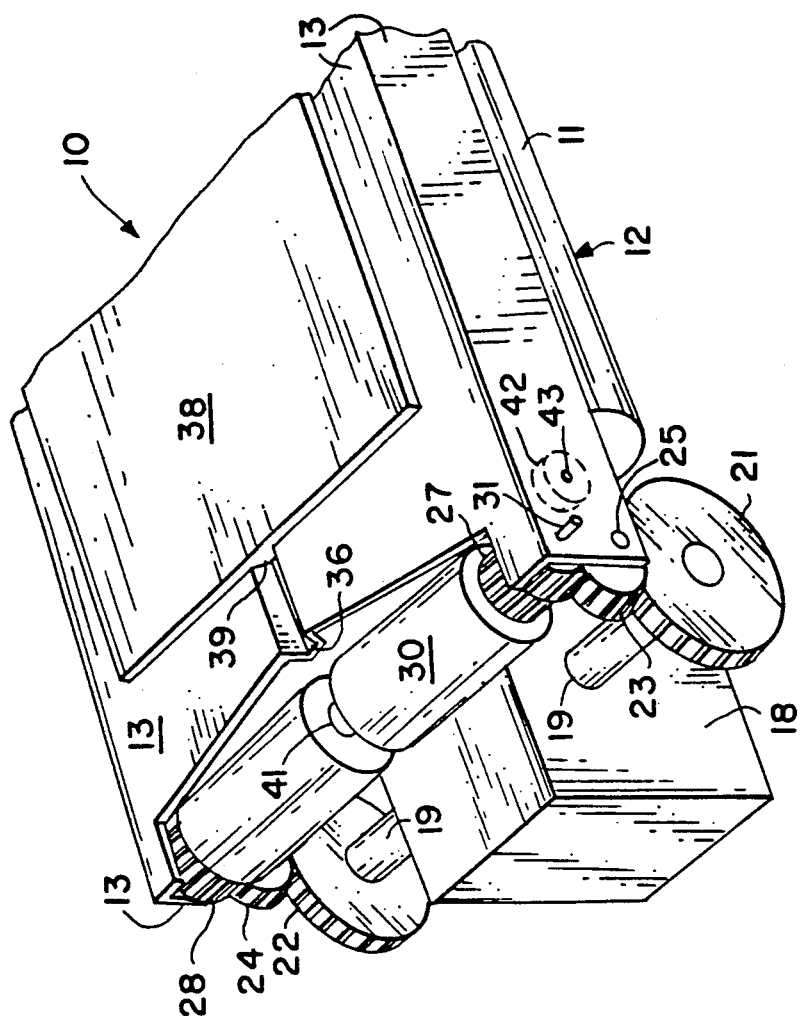
FIG. 2 is an enlarged perspective view of the end conveyor section of the system shown in FIG. 1 and illustrating the drive assembly therefor.

As shown more particular in FIG. 2, drive motor 11 leads to a reduction gear box 18. A drive shaft 19 extends transversely through gear box 18 and is rotatably driven by motor 11. A drive gear is integrally attached to each of the opposite ends of drive shaft 19, as designated by reference numerals 21, 22. Drive gears 21, 22 mesh with respective idler gears 23, 24 rotatably secured to opposite sides of frame 13 via axle 25 that spans the width of and extends through the sides of frame 13. Idler gears 23, 24 mesh, respectively, with roller gears 27, 28 integrally secured to belt roller 30. Roller gears 27, 28 are rotatably disposed on a spindle 31 that spans the width of and extends through the sides of frame 13, as will be further explained hereinafter. The top of frame 13 serves as a belt support surface and is provided with a groove depression 36 along the entire length and at substantially the longitudinal center thereof. An endless conveyor belt 38 having a linearly depending projection 39 extending along the entire length thereof, is slidably disposed on the top surface of frame 13. The depending projection 39 of belt 38 is more clearly shown in FIG. 6. Belt roller 30 is provided with an intermediate circumferential groove 41 aligned with and of substantially the same configuration as groove 36 in frame 13 and serves to also receive projection 39 as belt 38 rotates thereon.

Figure 3:
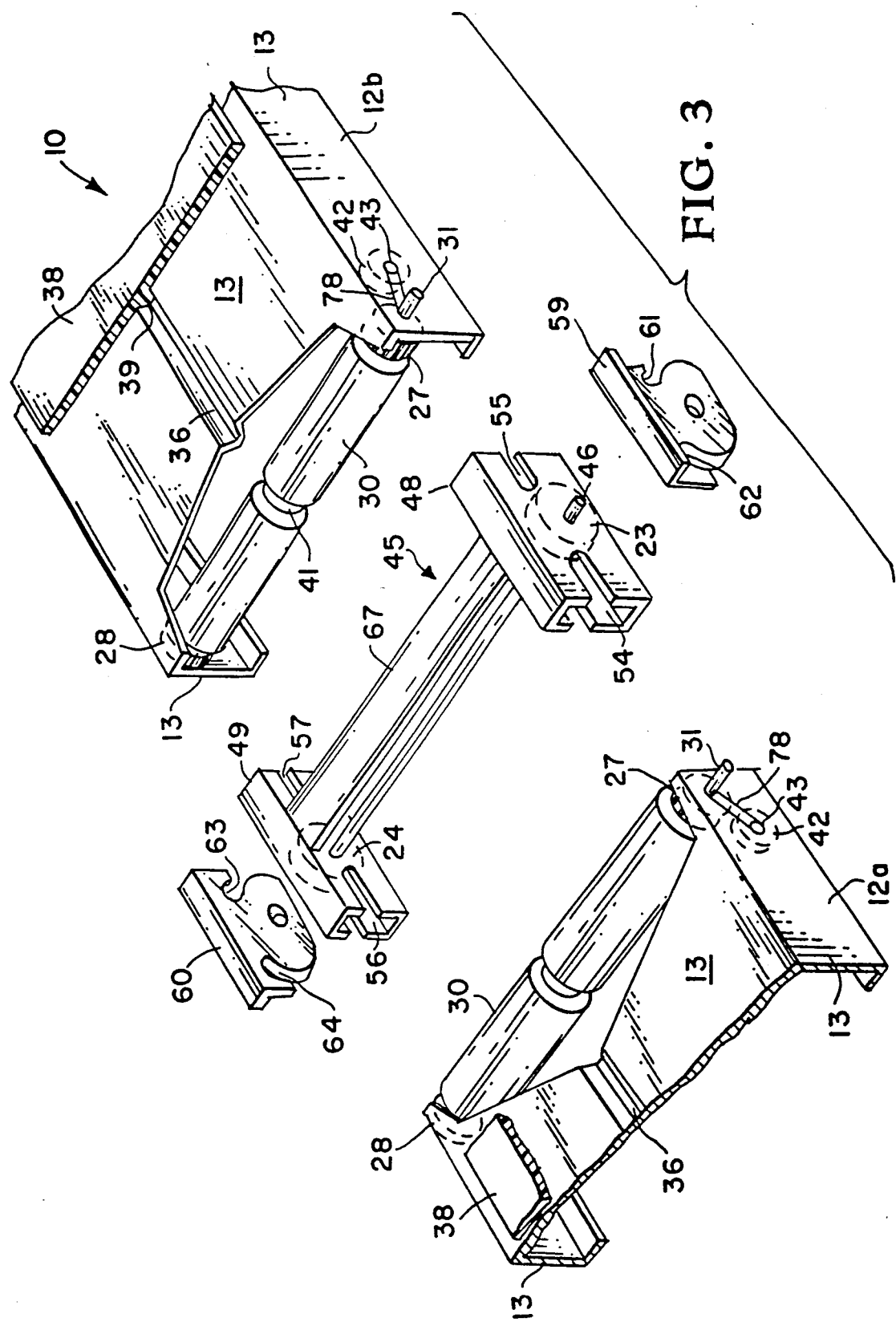
FIG. 3 is an exploded, partial, view of two adjacent conveyor sections with the conveyor belts therefor being partially shown and illustrating the bridge mechanism employed between each two adjacent conveyor sections.

As shown in FIGS. 2 and 3, the center portion of the top elongated surface of frame 13, for each of conveyor segments 12, 12a, 12b, etc., angularly terminates short of belt roller 30 at each end of the respective conveyor segments, with both sides of frame 13 extending over spindles 31. Snugger roller 42, disposed on spindle 43, serves to maintain the desired tension on belt 38, as will be further explained hereinafter.

Referring now more particularly to FIG. 3, an exploded view of a portion of conveyor system 10 is shown and illustrates portions of the two adjacent conveyor sections 12a, 12b, (as shown in FIG. 1) and the bridge mechanism 45 for connecting these sections in end-to-end relationship. Conveyor section 12a, 12b are of identical construction with an opposite end of each being illustrated in FIG. 3. For brevity, only the end of conveyor section 12b shown is described in detail herein, it being understood that the opposite end of conveyor section 12a is identical to the end shown for section 12b. Also, the end of section 12b not shown is identical to the end of section 12a that is shown and described herein.

As discussed hereinbefore, each conveyor section 12, 12a, 12b, etc. includes an elongated, rectangular lightweight metal (aluminum, aluminum alloy, or the like) frame 13 having in-turned, angular cross-sectional, sides. The top belt support surfaces of frames 13 are each provided with a respective groove depression 36 along the entire length and at substantially the longitudinal center thereof. Endless conveyor belts 38, each having a linearly depending projection 39, extending along the entire length thereof, are disposed on frames 13 of conveyor sections 12, 12a, 12b, etc. As discussed hereinbefore, the depending projection 39 for belt 38 is more clearly shown in FIG. 6.

Each end of each conveyor section is provided with a belt roller 30 spanning, and rotatably supported by, the rectangular frames 13. A roller spindle 31 extends from each end of each belt roller 30 and through the respective sides of frames 13. Roller gears 27, 28 are integral with rollers 30 and are, therefore, also rotatably disposed on spindles 31.

Each belt roller 30 is provided with a respective intermediate circumferential groove 41 aligned with, and of substantially the same configuration as, groove depressions 36 in frame 13. Grooves 41 also serve to receive depending projections 39 on endless belts 38. Grooves 36 and 41 serve to maintain belts 38 in alignment on frame 13 during operation of conveyor system 10.

A bridge mechanism 45 is disposed between each two adjacent conveyor sections 12, 12a, 12b, etc., contained within conveyor system 10. Bridge mechanism 45 includes a bridge spindle 46 extending the length of bridge mechanism 45. A pair of idler gears 23, 24 are rotatably disposed adjacent opposite ends of bridge spindle 46 and adjacent respective end brackets 48 and 49, as will be further explained hereinafter. End brackets 48, 49 are attached to and spaced from the respective ends of bridge spindle 46. Oppositely disposed cut-away segments or grooves 54, 55 on bracket 48, and 56, 57 on bracket 49, serve to receive roller spindles 31 on conveyor sections 12a, 12b when bridge mechanism 45 is positioned to connect these sections together. A pair of latch plates 59, 60 are rotatably secured on the exterior of frame 13 about opposite ends of bridge spindle 46 and serve to receive and latch to the ends of bridge spindles 31 of adjacent conveyor sections 12a, 12b. Latch plates 59 and 60 are each provided with oppositely disposed arcuate cut-away grooves designated, respectively, by reference numerals 61, 62 on latch plate 59, and 63, 64 on latch plate 60. A horizontally disposed skid plate 67 is secured between and spans the space between end brackets 48, 49. Skid plate 67 has a length substantially equal to the width of endless belts 38 and serves to fill the gap between, and to provide a support for any cargo being moved by, the conveyor belts on adjacent conveyor units.

In operation, conveyor sections 12a, 12b are positioned in end-to-end adjacency, as shown in the exploded view of FIG. 3. Bridge mechanism 45 is placed between sections 12a, 12b with end bracket 48 (FIG. 5) being slidably positioned between roller gear 27 and the sides of elongated frame 13 on sections 12a, 12b. Cutaway grooves 54 and 55 of bracket 48 extend over respective spindles 31 adjacent one end thereof within conveyor sections 12a, 12b while cut away grooves 56, 57 for bracket 49 extends over the spindles 31 adjacent the other end thereof thereby position skid plate 67 adjacent the respective endless conveyor belts 38.

Latch plate 59 is positioned exteriorly on one side of elongated frames 13 with arcuate cut-away groove 61 being positioned to receive roller spindle 31 on conveyor section 12b and latch plate 59 is rotated about bridge spindle 46 to place cut-away groove 62 in position to slide over roller spindle 31 on conveyor section 12a. Once both spindles 31 in conveyor sections 12a, 12b are engaged by arcuate cut-away grooves 61, 62 in latch plate 59, latch plate 60 is rotatably positioned to engage arcuate cut-away grooves 63, 64 therein about the opposite ends of spindles 31. Latch plates 59, 60 releasably lock conveyor sections 12a, 12b together to maintain skid plate 67 adjacent the respective endless conveyor belts 38 and place idler gears 23, 24 into meshing engagement with roller gears 27, 28 on both conveyor sections 12a, 12b. Any suitable retention device, such for example, retaining rings and washers (not shown) may be employed on the respective ends of spindles 31, to retain latch plates 59, 60 thereon.

When it is desired to dismantle the conveyor sections or to remove one segment, rotation of latch plates 59, 60 in a clockwise direction (FIG. 3) will remove arcurate grooves 62, 64 from spindle 31 on conveyor section 12a and thereby release conveyor section 12a from bridge mechanism 45, while maintaining engagement of bridge mechanism 45 to conveyor section 12b. A subsequent counter-clockwise rotation of latch plates 59, 60 will remove arcurate grooves 61, 63 from spindle 31 on conveyor section 12b and thereby release engagement between bridge mechanism 45 and conveyor section 12b.

When roller gears 27, 28 on conveyor section 12 are driven by drive motor 11, the drive force will be transferred to the roller gears 27, 28 on conveyor sections 12a, 12b through idler gears 23, 24 in each bridge mechanism 45 to maintain continuous movement of endless conveyor belts 38, with cargo moved thereby moving over narrow skid plate 67 to reach the next conveyor section.

Figure 4:
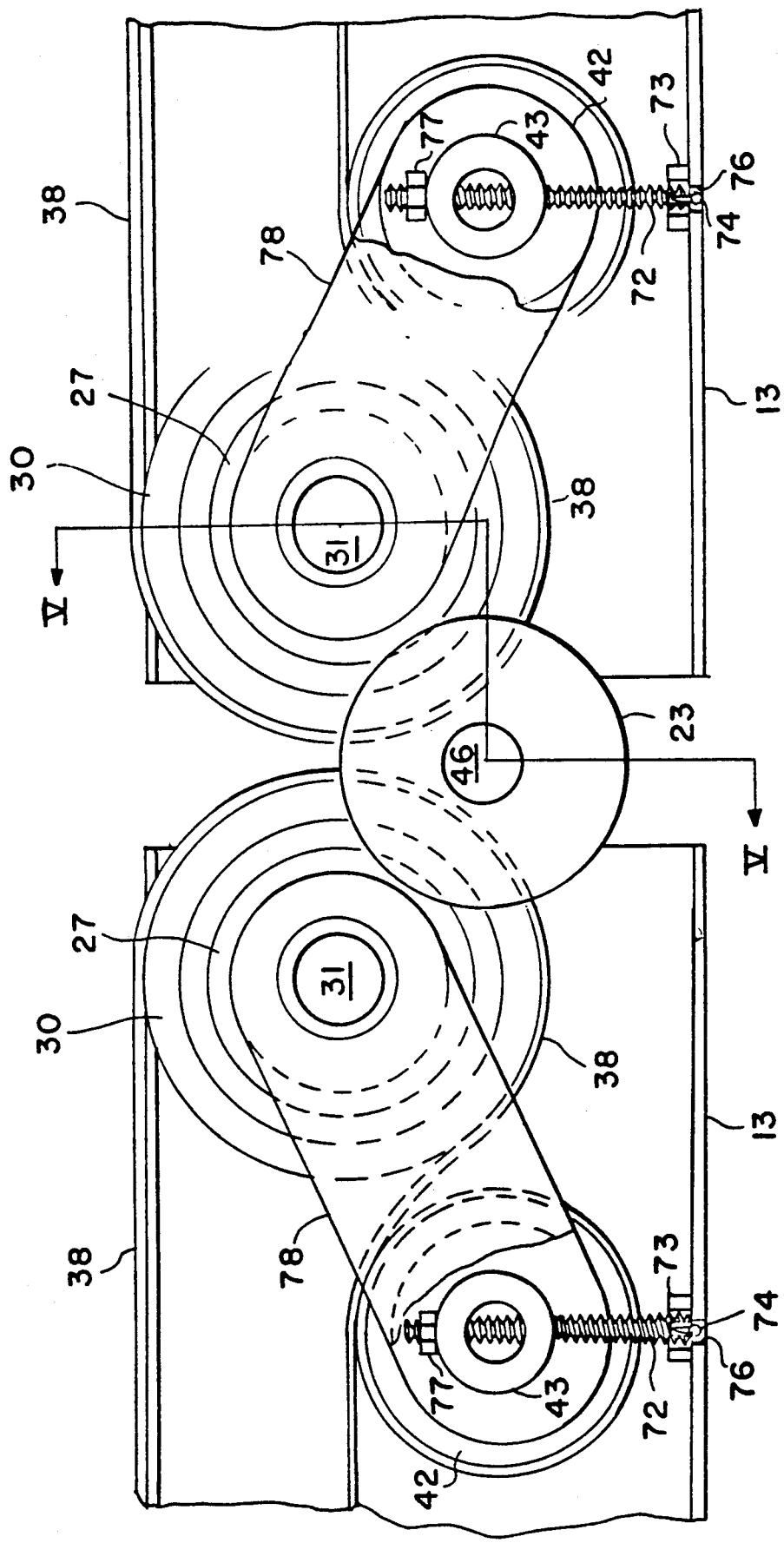
FIG. 4 is an enlarged side view of the end parts of adjacent conveyor sections (with parts omitted) as shown in FIG. 1 and illustrating the height adjustment and latch attachment mechanism for the snugger rollers relative to adjacent drive rollers.

Referring now more particularly to FIG. 4, the details of the adjustment and attachment mechanism for the snugger rollers 42 relative to the drive rollers 30 will now be described. As shown therein, a threaded height adjustment bolt 72 extends through a diametrically tapped opening provided in tubular spindle 43. Each end of each spindle 43 is provided with an adjustment bolt 72, with only one being shown and described herein in the interest of brevity, it being understood that the other end adjustment for spindle 43 is identical in structure and operation as that for the end described. Bolt 72 is provided with an integral hexagonal head portion 73 at one end therof that abuts and rests on the internal base portion of frame member 13. An integral locator pin 74 is disposed through bolt head 73 and extends therefrom. Locator pin 74 is loosely received within bore 76 provided through frame 13, as will be further explained hereinafter. A lock nut 77 is threadingly received on the free end of bolt 72 extending through spindle 43. To adjust the height of snugger roller 42, relative to the base of frame 13, a suitable wrench is placed through the end of frame 13 and applied to head 73 for rotation thereof. Nut 77 is tightened or backed off as needed to maintain contact with spindle 43. Locator pin 74 in bore 76 prevents extreme side displacement or lateral movement of bolt 72, relative to frame 13, but permits limited pivoting thereof as needed during height adjustment of snugger roller spindle 43. Changes in the height of snugger roller 42, relative to frame 13, controls the tension of belt 38, as will be further explained hereinafter. The force of belt 38 bearing against snugger roller 42 maintains locator pin 74 within bore 13.

A metal retention plate 78 having suitable openings therethrough is positioned over snugger roller spindle 43 and drive roller spindle 31. Retention plate 78 serves to limit relative lateral movement between snugger roller 42 and drive roller 30, while permitting vertical movement of snugger roller 42 during height changes thereof responsive to rotation of adjustment bolts 72. Thus, as the height of snugger roller 42 relative to frame 13 is changed, retention plate 78 freely pivots about spindles 31 and 43. Suitable shaft spacers and retention washers (not shown) are employed over spindles 31 and 43 to maintain retention plate 78 in position thereon.

Figure 5:
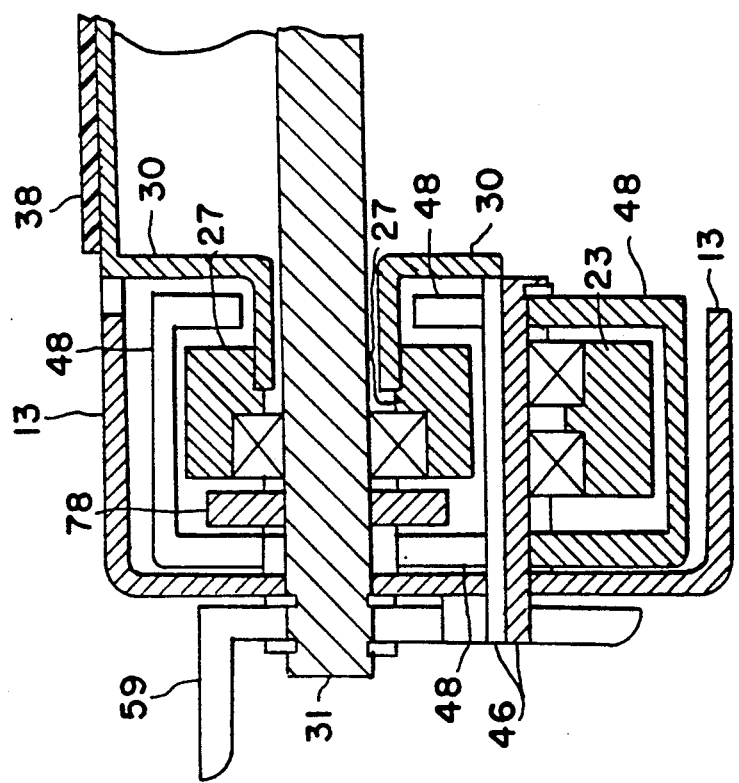
FIG. 5 is a sectional view of the bridged section shown in FIG. 4 and taken along line V—V thereof.

The sectional view of FIG. 5 illustrates the relative positioning of end bracket 48 within the end of frame 13.

Figure 6:
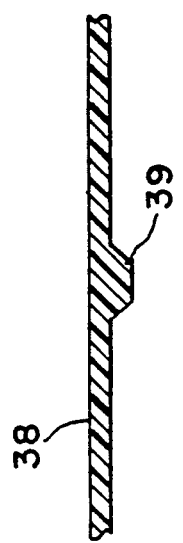
FIG. 6 is a transverse sectional view of one of the belts employed on the conveyor sections according to the present invention.

FIG. 6 shows a cross sectional area of belt 38 and illustrates the depending projection 39 thereof.

As mentioned hereinbefore in reference to FIGS. 1 and 2, a single drive motor 11 attached to conveyor section 12 serves as the driving force for the entire conveyor system 10 throught the indvidual idler gears on each bridge mechanism 45.

No specific motor or motor size has been described, it being understood that normally an electric motor of 1-2 horsepower would be adequate for most applications. Gasoline or hydraulic motors are equally applicable for use with the present invention and may be employed where electric current is not readily available. The motor or motors employed are conveniently attached to frame 13 via bracket 16. When one motor does not supply adequate power to drive the conveyor belts, additional motors may be employed on any one or several of the other conveyor sections. Also, as is conventional, reduction gear box 18 may be selected to adjust or control the speed of the endless conveyor belts 38 to that desired.

No specific material has been discussed for making the endless belts, it being understood that any suitable conveyor belt material now employed may be used, including composite materials, reinforced rubberized material, and the like.

Although the invention has been described relative to specific embodiments thereof, there are obviously many variations and modifications of the present invention that will be readily apparent to those skilled in the art in the light of the above teachings.

It is therefore to be understood that the specific embodiments of the invention described herein are merely illustrative of the invention and are not to be deemed as exhaustive. Thus, within the scope of the appended claims, the invention may be practiced other than as specifically described and illustrated herein.

What is claimed as new and desired to be secured by Letters Patent of the United States is:

1. A portable conveyor system comprising:
   a plurality of elongated conveyor sections disposed in adjacent end-to-end relationship;
   each said conveyor section including an elongated frame;
   an elongated belt support surface on said elongated frame,
   a belt roller essentially spanning the width and disposed in rotatable relationship adjacent an end of said belt support surface at each of said conveyor section;
   a conveyor belt rotatable supported by said belt support surface and extending over each said belt roller at each end of said conveyor section;
   a roller gear secured to each end of, and rotatable with, each said belt roller;
   a spindle rotatable supporting each belt roller and said roller gear thereon,
   said spindle having end portions extending from each end of said belt roller;
   an elongated bridge mechanism transversely disposed between each two adjacent conveyor sections;
   latching means carried by said bridge mechanism and serving to releasably latch said bridge mechanism to each of two adjacent conveyor sections;
   an idling gear rotatably carried at each end of each said bridge mechanism;
   said idling gear meshing with said roller gear on said belt roller of each adjacent conveyor section when said bridge mechanism is releasably latched thereto;

at least one drive motor connected to one of said plurality of conveyor sections to cause rotation of said roller gear and said belt roller;

a bridge spindle contained within said bridge mechanism;

an end bracket disposed on and spaced from each end of said bridge spindle;

an end portion of said bridge spindle extending through each said end bracket;

said idling gears being rotatable disposed on said bridge spindle adjacent each of said end brackets;

each said end bracket having slotted portions therein to slidable receive a roller spindle extending from a belt roller on adjacent conveyor sections; and, said latching means including a latch plate rotatable disposed adjacent, and exterior, to each said end bracket on said bridge spindle for releasably latching said bridge mechanism to each of two adjacent conveyor sections.

2. The portable conveyor system of claim 1 including said latch plate having a pair of arcuate grooves formed therein, each of said grooves having an open end and a closed end and being positioned over an end of a roller spindle extending from a belt roller on adjacent conveyor sections to maintain said adjacent conveyor sections in releasably attached relationship, said latch plate adapted to selectively and sequentially release the engaged roller spindles for dismantling of said conveyor system.

3. The portable conveyor system of claim 2 including said latch plate being rotated in a first direction to release one of said pair of arcuate grooves from engagement with a roller spindle extending from a frist conveyor section while retaining engagement with the roller spindle extending from an adjacent conveyor section and wherein said latch plate is rotated in an opposite direction to said first direction to release the roller spindle extending from said adjacent conveyor section.

4. The portable conveyor system of claim 1 wherein:
said drive means connected to one of said plurality of conveyor sections to cause rotation of said roller gears and said belt rollers comprises an electric motor;

a gear box connected to said electric motor;

a drive shaft extending transversely through said gear box;

a drive gear rotatably secured to each end of said drive shaft;

a pair of idler gears carried by said one of said plurality of conveyor sections and meshing, one each, with said drive gears rotatable secured to said drive shaft; and said idler gears also meshing, one each, with said roller gears secured to said belt roller.

5. A portable conveyor system comprising:
a plurality of elongated conveyor sections disposed in adjacent end-to-end relationship;

each said conveyor section including an elongated frame;

an elongated belt support surface on said elongated frame, a belt roller essentially spanning the width and disposed in rotatable relationship adjacent an end of said belt support surface at each end of said conveyor section;

a conveyor belt rotatably supported by said belt support surface and extending over each said belt roller at each end of said conveyor section;

a roller gear secured to each end of, and rotatable with, each said belt roller;

a spindle rotatably supporting each belt roller and the roller gear thereon, said spindle having end portions extending from each end of said belt roller;

an elongated bridge mechanism transversely disposed between each two adjacent conveyor sections;

latching means carried by said bridge mechanism and serving to releasably latch said bridge mechanism to each of two adjacent conveyor sections;

an idling gear rotatably carried at each end of each said bridge mechanism;

said idling gear meshing with said roller gear on said belt roller of each adjacent conveyor section when said bridge mechanism is releasably latched thereto;

at least one drive motor connected to one of said plurality of conveyor sections to cause rotation of said roller gear and said belt roller;

adjustment means carried by said elongated frame for adjusting and maintaining the desired tension on said conveyor belt;

said adjustment means including a snugger roller rotatably disposed on a spindle and in rotative contact with said belt;

support structure for said snugger roller connecting said snugger roller to said belt roller;

adjustable structure for varying the relative vertical position of said snugger roller to said belt roller;

said support structure for said snugger roller including plate means disposed over said snugger roller spindle and said belt roller spindle and serving to pivotally connect said snugger roller to said belt roller.

6. The portable conveyor system of claim 5 wherein said adjustment means carried by said elongated frame for adjusting and maintaining the desired tension on said conveyor belt includes threaded adjustment bolts extending through each said spindle for changing the vertical position of said spindle relative to said belt roller to thereby change the tension of said snugger roller against said conveyor belt.

7. The portable conveyor system of claim 6 wherein each said threaded adjustment bolt is provided with a hexagonal head portion abutting said elongated frame, an integral elongated locator pin extending from said head portion and received within an enlarged bore provided in said elongated frame, said locator pin permitting limited pivotal movement of said threaded adjustment bolt as the vertical position of said spindle relative to said belt roller is changed in response to turning of said threaded adjustment bolt through said spindle.

8. The portable conveyor system of claim 7 including a nut disposed on the end of said threaded adjustment bolt and abutting said spindle receiving said bolt, said nut being tightened or backed off as said threaded adjustment bolt is rotated within said spindle to maintain contact therewith, and wherein the pressure of said conveyor belt bearing against said snugger roller maintains adequate linear pressure on said threaded bolt to retain said locator pin within the enlarged bore of said frame.

* * * * *